March 14, 1939. D. R. BERLIN ET AL 2,150,537
RETRACTABLE LANDING GEAR
Filed Sept. 11, 1936 4 Sheets-Sheet 2
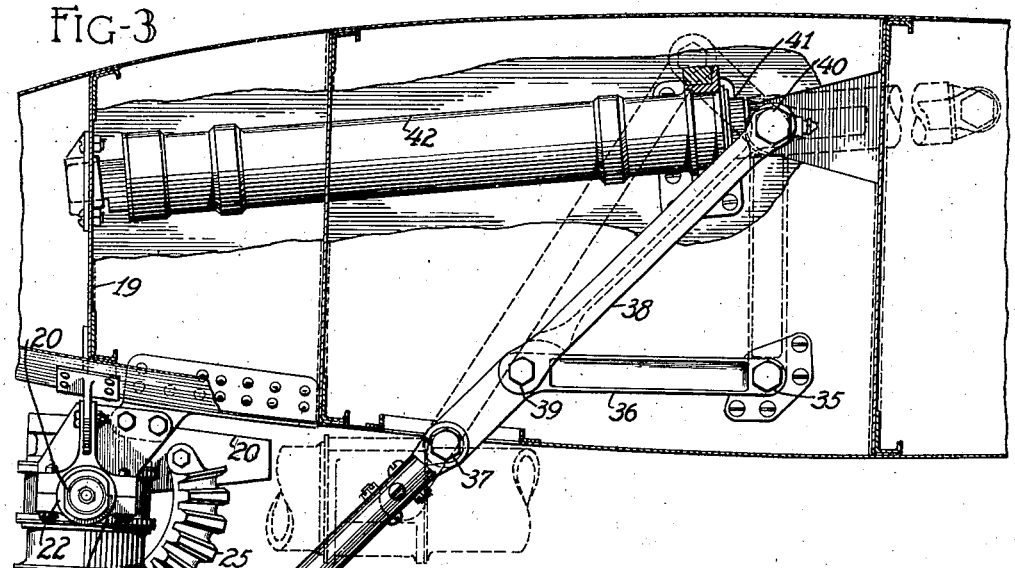
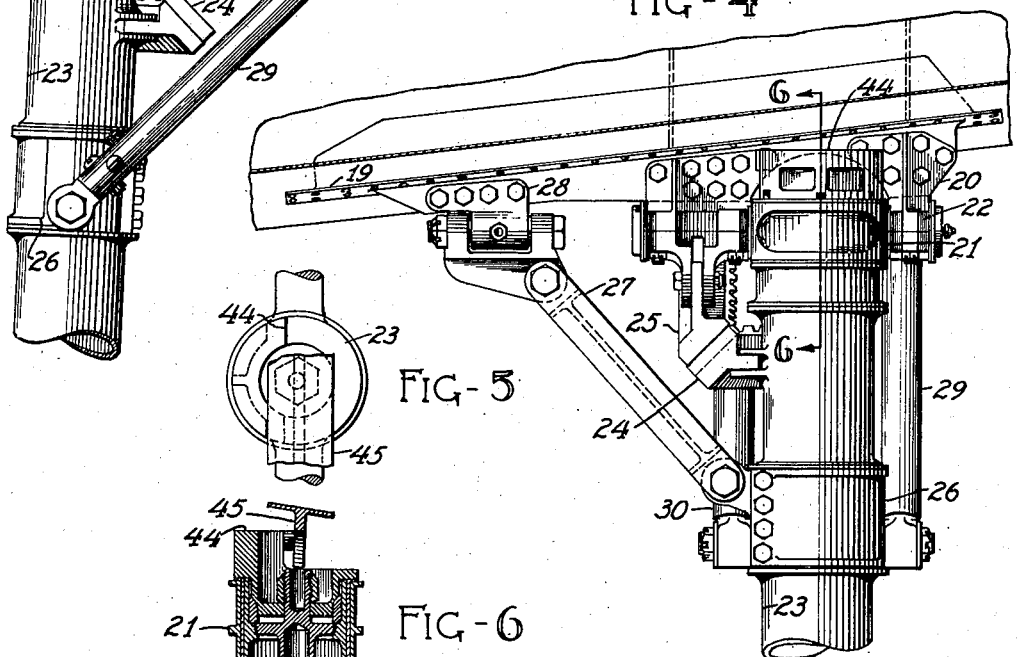
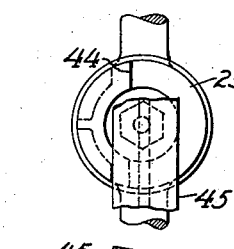
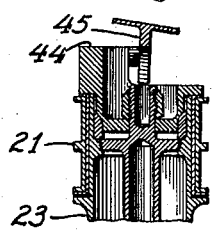
INVENTORS
DONOVAN R. BERLIN
WILLIAM O. WATSON
BY WALTER TYDON
ATTORNEY

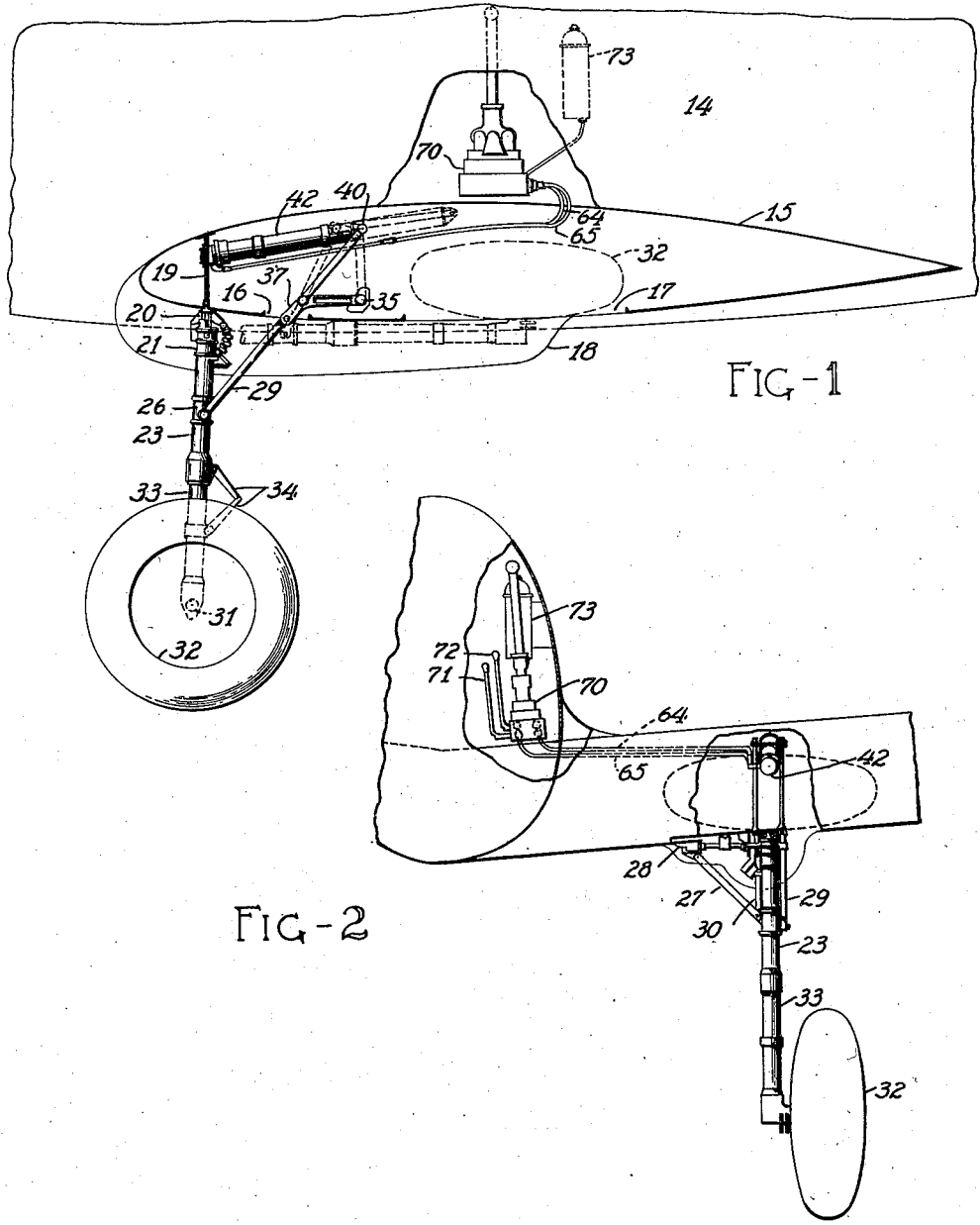

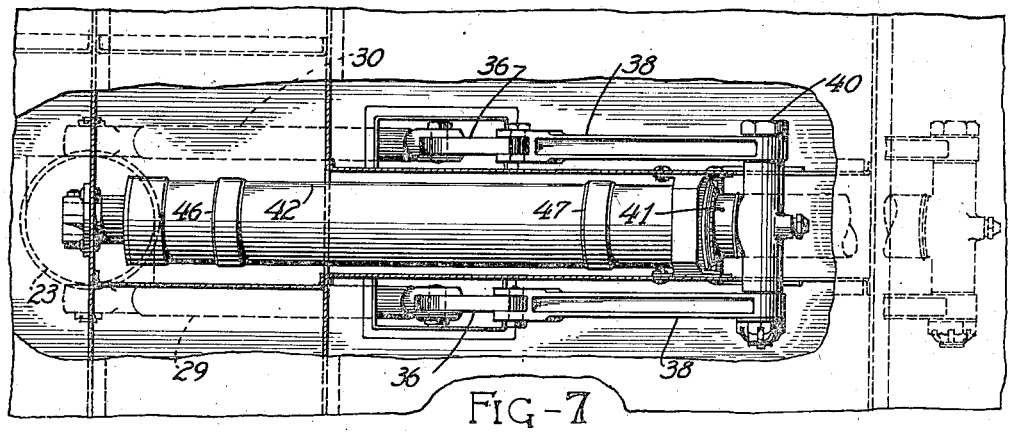
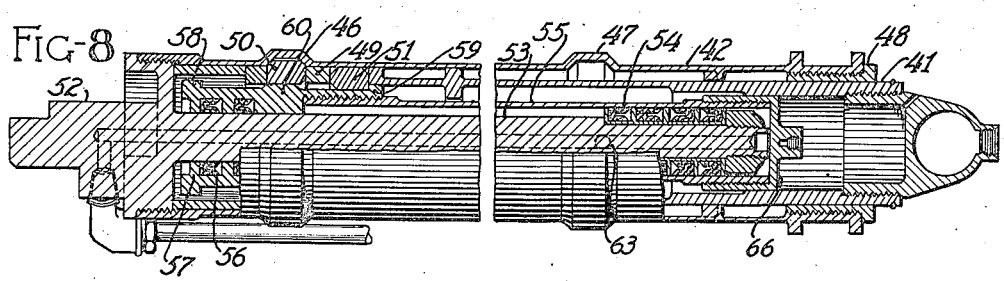
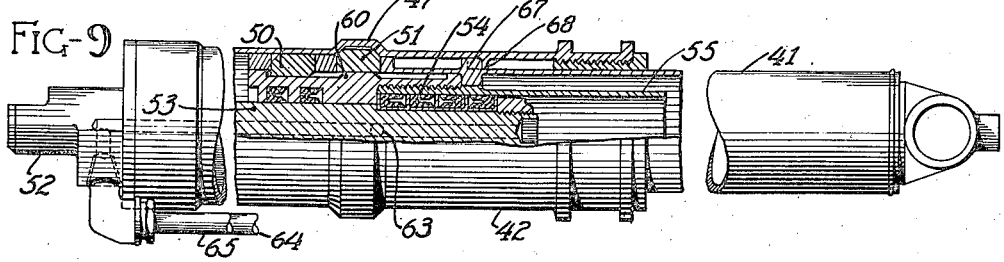
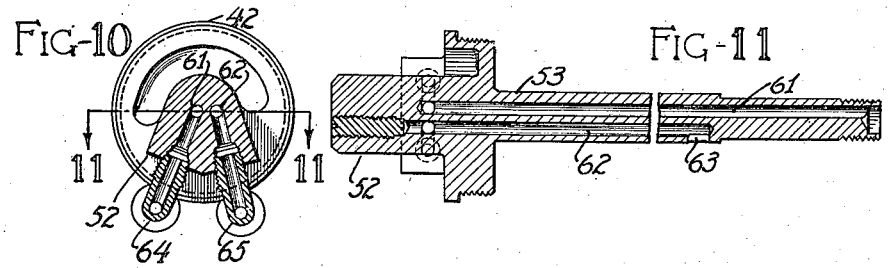

March 14, 1939.  D. R. BERLIN ET AL  2,150,537
RETRACTABLE LANDING GEAR
Filed Sept. 11, 1936  4 Sheets-Sheet 4
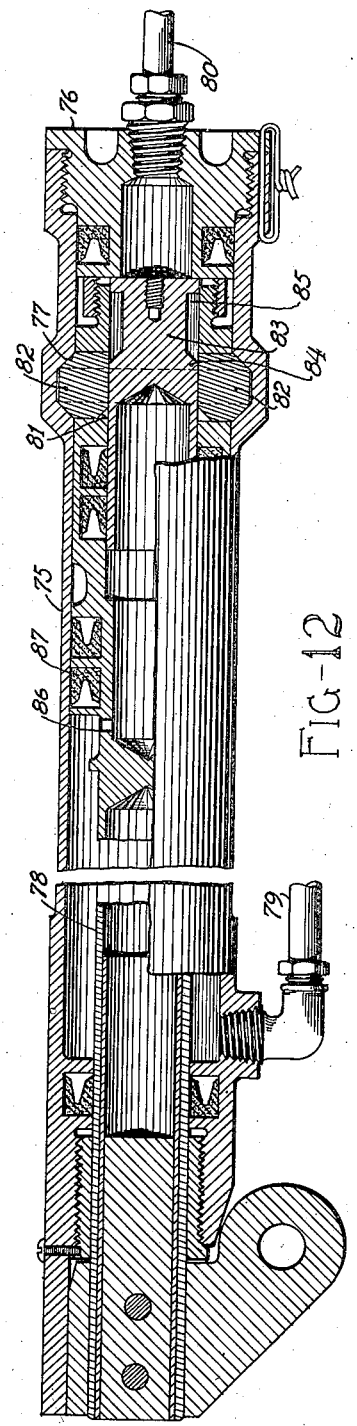
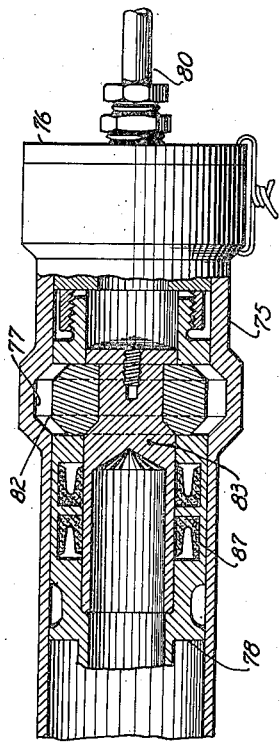
INVENTOR.
DONOVAN R. BERLIN
WILLIAM O. WATSON
WALTER TYDON
BY
ATTORNEY.

Patented Mar. 14, 1939

2,150,537

UNITED STATES PATENT OFFICE 2,150,537

RETRACTABLE LANDING GEAR

Donovan R. Berlin, Eggertsville, William O. Watson, Kenmore, and Walter Tydon, Buffalo, N. Y., assignors, by mesne assignments, to Curtiss-Wright Corporation, a corporation of New York Application September 11, 1936, Serial No. 100,278

9 Claims. (Cl. 244—102)

This invention relates to retractable landing gears for aircraft, and has to do with an improved form of single strut retractable landing gear, and also with an improved form of hydraulic retracting and extending strut.

Objects of the invention are to provide a landing gear of the single strut type in which improved mechanism is provided for simultaneously swinging a wheel carrying member of the landing gear from a ground contacting position to a nested position within the aircraft body, at the same time rotating the strut about its own axis to permit of the wheel lying flat against the under surface of the body.

A further object is to provide an improved form of retracting mechanism for a landing gear which is at all times adapted to lie within the confines of the aircraft.

Still a further object is to provide hydraulic piston and cylinder means for extending and retracting a landing gear, the piston and cylinder means including an automatically operated mechanical lock which serves to lock the retracting mechanism in either a fully extended or fully retracted position, thus avoiding inadvertent movement of the landing gear under influences of gravity or landing shock.

A further object is to provide a landing gear operating mechanism, having locking means at its extreme positions of adjustment, which locking means are sequentially operated in response to retractive or extensive movement of the mechanism, thus avoiding the necessity for a dual control organization for first operating the locking mechanism and secondly, operating the retracting mechanism.

A better understanding of the details of the invention may be reached by reading the annexed specification and claims and by viewing the drawings, in which:

Fig. 1 is a fragmentary side elevation, partly broken away, of an aircraft wing and fuselage showing the landing gear and the general arrangement of the retracting and extending mechanism therefor;

Fig. 2 is a front fragmentary elevation, partly broken away, showing the fuselage with its landing gear;

Fig. 3 is an enlarged side elevation showing certain elements of the landing gear;

Fig. 4 is an enlarged front elevation of part of the landing gear mechanism;

Fig. 5 is a plan of a part of the landing gear strut and associated support mechanism;

Fig. 6 is a section on the line 6—6 of Fig. 4;

Fig. 7 is a plan of a part of the landing gear showing the retracting and extending strut;

Fig. 8 is an axial section through the retracting and extending strut in one position of adjustment;

Fig. 9 is a partial axial section through the retracting and extending strut in another position of adjustment;

Fig. 10 is an end elevation partly in section, of the retracting and extending strut;

Fig. 11 is a partial section on the line 11—11 of Fig. 10;

Fig. 12 is a section through an alternative embodiment of a retracting and extending strut; and Fig. 13 is a fragmentary axial section through the strut of Fig. 12 in another position of adjustment thereof.

In the drawings, a fuselage 14 is represented as being provided with a low monoplane wing 15 having recesses 16 and 17 in the lower surface thereof, and being provided with a fairing 18 partly covering the said openings and arranged for streamlining certain parts of the landing gear presently to be described. A front wing spar 19 provides a principal point of support for the landing gear which includes trunnion fittings 20 depending therefrom, these trunnion fittings carrying a collar 21 for swinging movement in trunnion bearings 22. The collar embraces the cylinder of a shock absorbing landing gear strut 23, this being provided with a bevel gear sector 24 engaged with a fixed bevel gear sector 25 carried by the fittings 20. At a lower part of the strut 23, a second collar 26 is provided, this collar being linked to a lateral brace strut 27 pivoted at its other end to a fitting 28 fixed to the wing spar 19, the collar 26 also having pivoted thereto retracting struts 29 and 30 extending upwardly and rearwardly therefrom. The strut 23 carries a stub axle 31 and a wheel 32 mounted thereon. The strut 23 likewise includes a reciprocable plunger member 33, which carries the stub axle 31, the plunger member being held from rotation on its own axis with respect to the cylinder of the strut 23 by means of jointed links 34.

Within the wing, at 35, a pair of swingable levers 36 are pivoted, the ends of these levers being jointed to the struts 29 and 30, respectively, as at 37. Operating links 38 are pivoted at 39 to the levers 36, extending upwardly within the wing to a cross head 40 carried by a plunger 41 arranged for telescoping within a fixed cylinder 42, the latter being rigidly attached at one end to the wing spar 19 and being attached at its other end to a suitable fitting carried by the interior structure of the wing.

From the mechanism thus far described, the operation of the landing gear will be apparent—when the plunger 41 is forced from the cylinder 42, the links 38 will draw the levers 36 from the full line position as indicated in Figs. 1 and 3, to the dotted line position, whereupon the members 29 pull the landing gear strut 23 upwardly and rearwardly. As the upward and rearward movement of the strut 23 progresses, the coaction of the bevel gear sectors 24 and 25 will cause the strut 23 to rotate about its own axis in the collars 21 and 26 so that, when fully retracted, the wheel will have been turned through 90° about the axis of the strut 23 to lie horizontally within the recess 17. The recess 16 provides for passage of the levers 36 and the members 29. Extensive movement of the landing gear is accomplished by forcing the plunger 41 within the cylinder 42, whereby the landing gear strut 23 is forced forwardly and downwardly, at the same time turning so that in the extended position the strut extends substantially vertically downwardly and the wheel 32 lies in a plane parallel to the plane of symmetry of the aircraft.

As an additional safeguard against rotation of the strut 23 about its own axis when the landing gear is fully extended, the upper part of the strut 23, as shown in Figs. 5 and 6, is provided with a substantially semi-circular extension 44 engageable with an abutment 45 formed as part of the fitting 20. As soon as retraction of the landing gear is initiated, the extension 44 travels forwardly from the abutment 45; since it lies above the trunnions 22, and as the strut 23 turns on its own axis, the forward movement of the extension 44 is sufficient in magnitude to permit of its turning with the strut without interference with fixed parts of the landing gear when the latter is retracted.

Figs. 8 to 11, inclusive, show the retracting strut comprising the plunger 41 and cylinder 42, in detail. Toward its ends, the cylinder 42 is provided with annular protuberances 46 and 47, which provide annuli of larger diameter than the cylinder bore, within the bore. The plunger 41 is guided by a bushing 48 in the open end of the cylinder 42, and said plunger is provided with a larger diameter inner end at 49 to bear against the bore of the cylinder 42. This portion 49 is formed with arcuate openings extending circumferentially of the plunger within which, respectively, are placed locking blocks 50 and 51, said blocks having chamfered corners. It will be seen that the blocks 50 and 51 must at all times move axially with the plunger 41 but are capable of radial movement with respect to the plunger. As shown in Fig. 8, the block 50 is extended radially outward to engage within the annulus 46 of the cylinder 42, in which position, so long as the block 50 is held radially outward, the plunger is restrained from any axial movement with respect to the cylinder 42. Fig. 9 shows an analogous situation wherein the block 51 occupies the annulus 47 to restrain the plunger from axial movement relative to the cylinder 42. Fig. 8 represents the locking position for the landing gear when the latter is in its fully extended position, in which case, the plunger 41 is translated wholly within the cylinder 42. Fig. 9 shows a locking position for the landing gear in its retracted attitude.

The left hand end of the cylinder 42, as shown, is provided with a closure block 52 carrying a shaft 53 extending axially through the cylinder and also through the plunger 41. The shaft 53 carries a packing 54 at that end farthest from the block 52, and over this shaft an auxiliary piston 55 is arranged, the piston having an internal diameter greater than the diameter of the shaft 53, but snugly engaging the packings 54. The left hand end of the auxiliary piston 55 is provided with packings 56 engaging snugly against the shaft 53. A member 57, carrying the packings 56, forms the left hand end of the auxiliary piston, and its outer surface is arranged with end abutments 58 and 59 and an intermediate cam 60, the portions between the cam 60 and the respective abutments 58 and 59 being of reduced diameter. Referring to Fig. 8, it will be noted that the locking block 51 is of such thickness as to lie between the surface of the bore of the cylinder 42 and one of these reduced diameter portions, while the locking block 50 is held outward in engagement with the annulus 46 of the cylinder 42 by virtue of the cam 60 being located therewithin.

Ducts 61 and 62 are provided within the shaft 53, the duct 61 extending through the end of the shaft, while the duct 62 terminates in a radial opening 63 just to the left of the packing 54. Fluid conduits 64 and 65 lead from the respective ducts 61 and 62 to pump means shown in Fig. 1 and shortly to be described. Viewing the mechanism as shown in Fig. 8, when fluid is admitted under pressure through the duct 61, the auxiliary piston 55 is forced to the right, said piston having a right hand end closure 66 thereon, the auxiliary piston first moving to the right with respect to the plunger 41 due to the fact that said plunger is locked from axial movement relative to the cylinder 42 by virtue of the locking block 50. As the cam 60 uncovers the locking block 50, the latter is forced radially inward from the annulus 46 by virtue of the chamfered edges of the block and annulus, whereby the plunger is unlocked from the cylinder. Further movement of the auxiliary piston 55 to the right causes abutment between the end of the plunger and the abutment 58, so that further admission of fluid under pressure through the duct 61 causes outward movement of the plunger with respect to the cylinder 42. This movement continues to the position of Fig. 9 whereat a protrusion 67 on the plunger comes into contact with a stop 68 in the bore of the cylinder, preventing further outward travel of the plunger relative to the cylinder. However, the auxiliary piston 55 continues to travel to the right whereupon the cam 60 engages the inner surface of the locking block 51, forcing the latter into engagement within the cylinder annulus 47, whereupon the plunger is effectively locked from any further axial movement in either direction with respect to the cylinder 42.

In order to retract the plunger 41 within the cylinder 42, fluid under pressure is forced through the duct 62 and opening 63 whereupon fluid enters between the shaft 53 and piston 55; the auxiliary piston 55 is moved to the left with respect to the shaft 53 to first cause unlocking of the block 51 from the annulus 47, to then cause leftward translation of the auxiliary piston 55 and the plunger 41 together, and finally, to engage the locking block 50 with the annulus 46 by virtue of the action of the cam 60 upon the block. It should be noted in connection with the structure just described that pressure of the hydraulic fluid is wholly confined between the auxiliary piston 55 and the shaft 53, the cylinder 42 and the plunger 41 being not subject to fluid pressure directly but merely having a mechanical connection with one another. By this arrangement, fluid leakage is minimized, the packings 56 being the only ones which are subjected to any degree of fluid pressure which might have a tendency to cause leakage. These packings, being well within the apparatus, are protected, as is the exterior surface of the shaft 53, so there is little likelihood of leakage. It should also be noted that the only periods during which it is necessary to have a substantial degree of hydraulic pressure on the apparatus is during the actual time when the landing gear is to be extended or retracted. Otherwise, the pressure within the retracting strut may be nil, by which fluid leakage may not occur.

Fluid is fed to the conduits 64 and 65 from a pump unit 70, shown in Figs. 1 and 2. The pump unit is provided with valves having operating handles 71 and 72 by which pump pressure may be directed to either conduit and whereby the return flow of fluid from that conduit which is not under pressure may be fed back to the pump. The pump may also be provided with a supply tank 73 which carries an excess supply of hydraulic fluid to maintain the hydraulic system completely full at all times.

In Figs. 12 and 13, we show an alternative form of hydraulic extending and retracting strut having only a single locking organization which, as shown, is arranged to lock the strut when it is in a fully compressed state. Herein, a cylinder 75 is provided with an end closure 76 and an annulus 77. A plunger 78 is arranged to slide back and forth within the cylinder. Conduits 79 and 80 are provided at the extreme ends of the cylinder for the admission or emission of fluid. At its right hand end, as shown, the piston 78 is provided with recesses 81 within which locking blocks 82 are radially movable into and out of engagement with the annulus 77. Within the plunger 78 is a floating piston 83 having a cam 84 and an annular groove 85, the piston 83 being mounted for limited axial movement within the plunger 78. When fluid under pressure is admitted through the conduit 80, said fluid acts upon the right hand head of the floating piston 83, traversing same to the left, whereby the groove 85 lies in the same plane as the locking blocks 82 so that the latter may move radially inward, out of engagement with the annulus 77, to permit of leftward movement of the plunger 78 upon further application of hydraulic pressure at the conduit 80. When it is desired to again retract the strut, fluid pressure is admitted through the conduit 79, fluid passing around the plunger 78 and through a port 86 in the wall of the plunger 78 to act upon the left hand end of the floating piston 83, the hydraulic pressure also acting against the left hand end of packings 87, whereby the plunger is moved to the left with respect to the cylinder 75. During this action, the locking blocks 82 bear against the bore of the cylinder 75, and as soon as these blocks reach a position which is substantially coplanar with the annulus 77, they are cammed radially outward by the action of the floating piston 83 thereon, whereupon the cam portion 84 of the floating piston lies under the blocks to hold them in locking relationship with the cylinder 75. Thereupon, pressure on the system may be relaxed to avoid the possibility of fluid leakage, and the piston and cylinder are positively locked to one another.

It will be clear that the particular form of hydraulic retracting strut with its locking mechanism, as shown in detail in Figs. 8 to 13, inclusive, may be used in other forms of landing gear than that shown in Figs. 1 and 2, and conversely, other forms of retracting and extending struts may be used for the operation of a landing gear of the type disclosed.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In aircraft having a recess in the lower surface of a wing thereof, a collar trunnioned toward the leading edge thereof, a landing gear strut journalled in said collar for turning therein and for swinging therewith about said trunnion, into and out of said recess, a second collar embracing said strut with respect to which said strut is swingable, a member pivoted to said second collar for retracting and extending said strut, and means acting between said strut and aircraft for rotating said strut about its own axis during extensive and retractive movements thereof.

2. In an aircraft retractable landing gear, a wheel carrying strut having axially spaced journal portions thereon, collars borne on said journals, one said collar being trunnioned on said aircraft, a member pivoted to another collar and movable to bodily move said collar and the strut journalled therein, and means for rotating said strut in said collars responsive to bodily strut movement.

3. In aircraft retractable landing gears, a hydraulic extending and retracting mechanism comprising a cylinder having an enlarged annulus in the bore thereof, a piston slidable within said cylinder, having recesses therein, segmental lock blocks in said piston recesses, an auxiliary piston within said first piston having cam faces engageable with said blocks for urging them radially outward in said piston recesses into engagement with said cylinder annulus for locking said piston to said cylinder, said auxiliary piston having limited travel with respect to said main piston, and a fluid entrance connection in said assembly to each side of said pistons.

4. In a landing gear extending and retracting device, a hydraulic piston-cylinder assembly, the cylinder having axially spaced annular enlargements in the bore thereof, said piston comprising a sleeve having recesses toward the end thereof, locking blocks in said recesses radially movable into and out of engagement with said grooves when the recesses are located opposite said grooves, an auxiliary piston having limited travel within said piston sleeve, and cams formed on said auxiliary piston organized to move said blocks outward through said recesses upon relative movement between the sleeve and auxiliary piston.

5. In a landing gear extending and retracting device, a hydraulic piston-cylinder assembly, the cylinder having axially spaced annular enlargements in the bore thereof, said piston comprising a sleeve having recesses toward the end thereof, locking blocks in said recesses radially movable into and out of engagement with said grooves when the recesses are located opposite said grooves, an auxiliary piston having limited travel within said piston sleeve, cams formed on said auxiliary piston organized to move said blocks outward through said recesses upon relative movement between the sleeve and auxiliary piston, conduits communicating with the respective ends of said piston, and means selectively operable to direct fluid under pressure to either of said conduits.

6. In a piston and cylinder assembly wherein the piston and cylinder are relatively movable upon application of hydraulic pressure, blocks movably carried by the piston and engageable with the cylinder to lock the piston and cylinder from relative movement, an auxiliary piston movable with and with respect to the first said piston, and cam means respectively carried by the auxiliary piston and the cylinder for moving said blocks into and out of locking engagement with the cylinder.

7. A retracting and extending mechanism for retractable landing gears comprising a cylinder, a plunger slidable in said cylinder having a main piston head in fitting engagement with the cylinder bore, an auxiliary piston slidable in limited degree within said plunger, a conduit communicating with the plunger and with said auxiliary piston, locking blocks carried by said main piston for radial movement relative thereto, said cylinder having recesses within which said blocks are at times adapted to engage, and cam means carried by said auxiliary piston, engageable with said blocks for urging them radially outward into locking engagement with the cylinder upon imposition of hydraulic pressure, through said conduit, upon said plunger and auxiliary piston.

8. A retracting and extending mechanism for retractable landing gears comprising a cylinder having a concentric headed shaft extending axially thereof, a support forming an end closure for the cylinder by which said shaft is carried, a plunger slidable within said cylinder, the cylinder, toward the ends thereof, having recesses, locking blocks carried by said plunger and substantialy radially movable relative thereto for engagement, at times, with said cylinder recesses, a hollow floating piston within said plunger, embracing said shaft and in close fitting engagement with the shaft head, packings effecting fluid tight seals between said shaft and floating piston, cams carried by said floating piston engageable with said locking blocks for urging them outwardly into locking engagement with the said cylinder recesses, and fluid conduits extending through said shaft.

9. In a landing gear extending and retracting device, a hydraulic cylinder and piston assembly, the cylinder having a recess in the cylinder bore surface, a locking lug movable with and with respect to said piston organized for locking engagement within said recess when positioned adjacent thereto, an auxiliary piston movable with and with respect to said first piston subject to hydraulic pressure within said assembly, means responsive to relative movement between said pistons for positively moving said lugs into locking engagement within said recess, and means for selectively introducing fluid to said cylinder at opposite ends of said pistons for effecting movement of said pistons relative to said cylinder and of said pistons with respect to each other.

DONOVAN R. BERLIN.
WILLIAM O. WATSON.
WALTER TYDON.